United States Patent [19]

Molineux

[11] Patent Number: 4,603,792

[45] Date of Patent: Aug. 5, 1986

[54] TICKET ISSUING MACHINE WITH PRODUCT DISPENSER

[76] Inventor: Royston D. Molineux, 6 The Firs, Bexley, Kent, England

[21] Appl. No.: 630,230

[22] Filed: Jul. 12, 1984

[30] Foreign Application Priority Data

Jul. 21, 1983 [GB] United Kingdom ................ 8319683

[51] Int. Cl.[4] ............................................ G01F 11/16

[52] U.S. Cl. ........................................ 221/96; 221/9; 221/15; 221/232; 222/40; 222/641; 271/10; 271/13

[58] Field of Search ...................... 221/92, 93, 96, 15, 221/13, 199, 232, 236, 9; 194/2, 13; 222/192, 23, 40, 64, 638-643; 271/10, 131, 141; 340/603-606, 609, 616, 618, 620

[56] References Cited

U.S. PATENT DOCUMENTS

| | | | |
|---|---|---|---|
| 3,360,094 | 12/1967 | Romanowski | 194/13 |
| 3,416,705 | 12/1968 | Hohmann | 221/9 X |
| 3,542,244 | 11/1970 | Dyer et al. | 221/232 X |
| 3,570,845 | 3/1971 | Kellerman | 271/131 |
| 4,140,259 | 2/1979 | Kostka | 221/93 X |
| 4,202,468 | 5/1980 | Anderson et al. | 221/93 |
| 4,218,014 | 8/1980 | Tracy | 222/145 X |
| 4,238,125 | 12/1980 | Klietz | 271/131 X |
| 4,278,186 | 7/1981 | Williamson | 222/36 |
| 4,436,223 | 3/1984 | Wilson | 222/40 X |

*Primary Examiner*—Joseph J. Rolla
*Assistant Examiner*—Kevin P. Shaver
*Attorney, Agent, or Firm*—James C. Wray

[57] ABSTRACT

A ticket dispensing machine includes a stack support, posts and guide and the lowest ticket from the stack is moved by a striker plate actuated by a solenoid towards a pair of rollers the lower one being driven by motor which takes up the dispensing action. A nozzle with a fluid sensor detects passage of fluid e.g., beer and actuates the ticket dispensing operation after a predetermined period corresponding to a given volume of fluid discharge.

7 Claims, 10 Drawing Figures

TICKET ISSUING MACHINE WITH PRODUCT DISPENSER

BACKGROUND TO THE INVENTION

This invention relates to a ticket dispensing machine which may be used for example for dispensing promotion tickets in various premises such as public houses and clubs. Ticket dispensing may also be used for coin operated systems—e.g., fruit-machines, railway ticket machines.

SUMMARY OF THE INVENTION

According to the invention there is provided a ticket dispensing machine for application to a product dispensing apparatus, said machine comprising (a) support means for a stack of tickets, (b) a ticket drive roller, (c) an electric motor drivably coupled to said roller, (d) striker means adapted to engage an edge of the end ticket of the stack, (e) means for driving said striker means in a direction to convey said ticket towards said roller, (f) a sensor capable of initiating a signal on detecting the presence of a product being dispensed, (g) electric circuit means connected to said sensor to activate said electric motor thereby to dispense said ticket from the machine on receipt by said circuit means on an input signal initiated by said sensor, (h) timing means to actuate the motor and the striker drive means after a predetermined period from commencement of sensing of the presence of the product, said timing means being adapted to actuate the motor and the striker drive means only when the predetermined period exceeds a preselected value, and (i) means for automatically repositioning said striker means to be available for dispensing the next ticket when required.

The input signal for the electric circuit means may be provided by a simple push-button return switch. However, in the embodiment of the invention described below the input signal is generated through the medium of a sensor located in a dispensing nozzle of a beer pump head. In this manner as the beer passes through the nozzle the sensor will cause the electric circuit means to activate the striker means which delivers the ticket into the mouth formed by said driver roller and a pressure roller which convey the ticket to the exterior of the machine. The housing of the machine may be of the kind provided on bar counters having a display window illuminated from within the housing.

BRIEF DESCRIPTION OF THE DRAWINGS

The invention will now be described by way of example with reference to the accompanying drawings in which:

FIGS. 6A, 6B and 6C show respectively schematic sequential views of a ticket being dispensed from a stack;

DESCRIPTION OF PREFERRED EMBODIMENT

Figure 1:
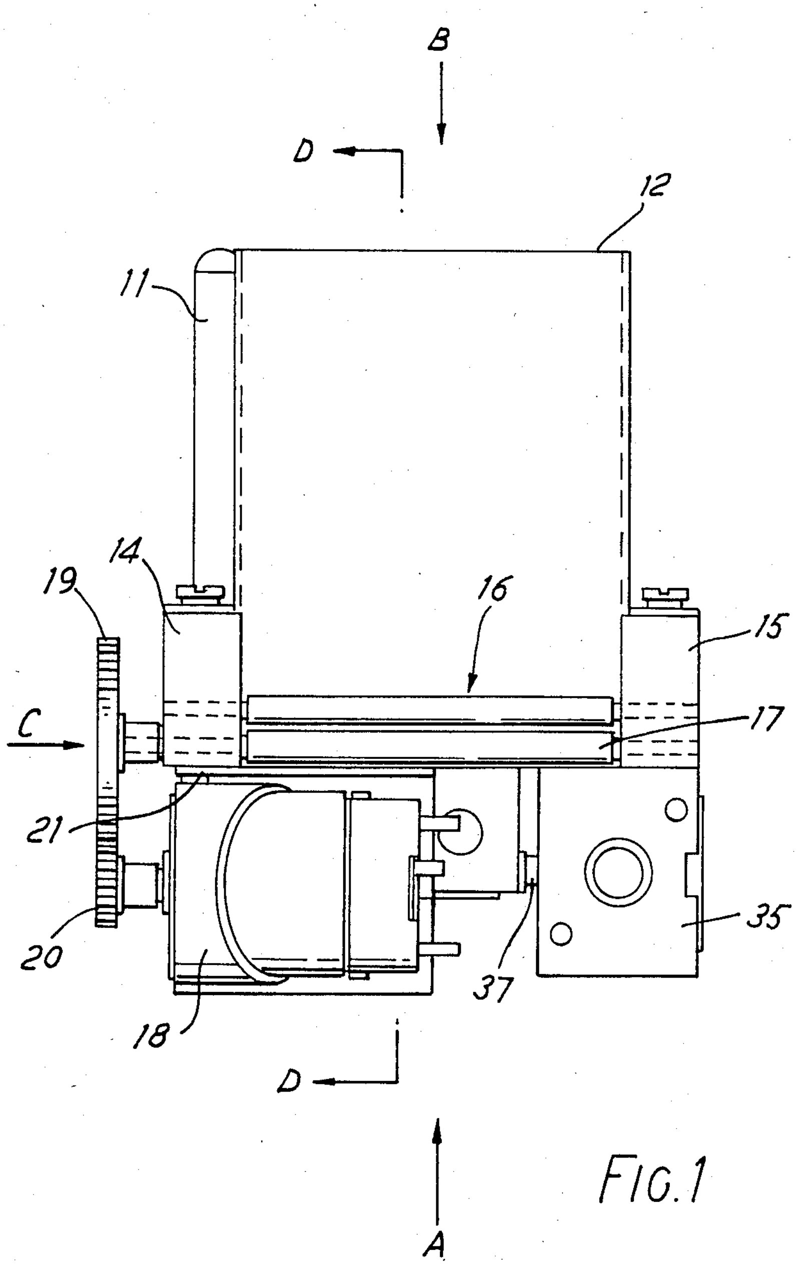
FIG. 1 is a front elevation of the ticket dispensing apparatus with the housing omitted for clarity.
Figure 2:
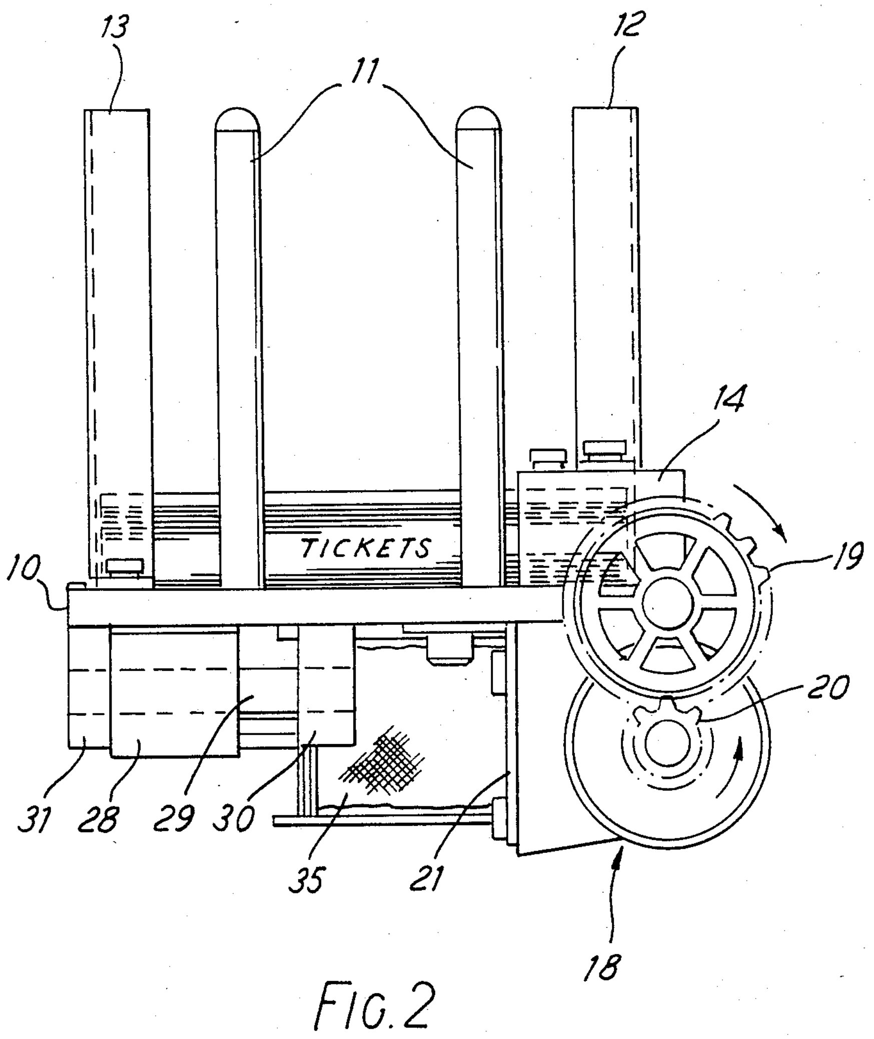
FIG. 2 is a side elevation taken in the direction of arrow C in FIG. 1.
Figure 4:
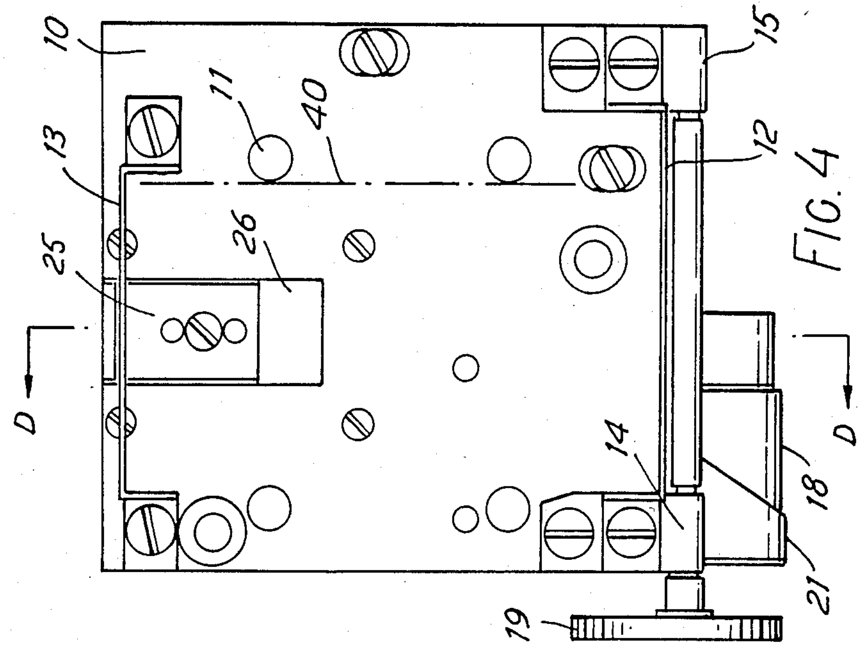
FIG. 4 is a plan view (arrow B, FIG. 1)
Figure 3:
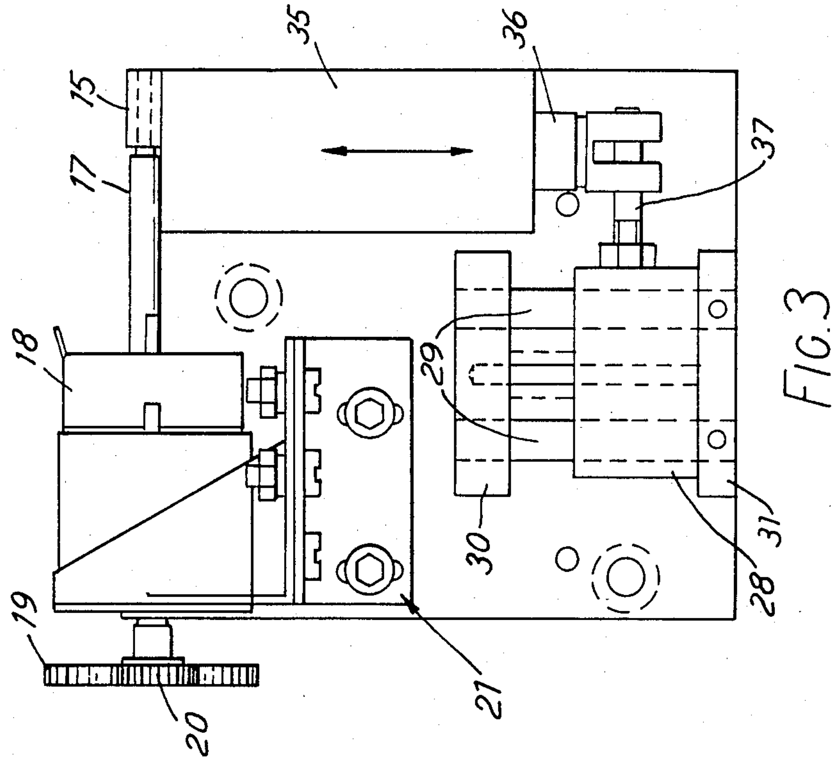
FIG. 3 is an underplan viewed in the direction of arrow A in FIG. 1.

The dispensing apparatus comprises a support plate 10 having a ticket stack guide thereon formed by four upstanding posts 11 and end channels 12, 13. Bearing blocks 14, 15 are mounted on the plate 10 at one end thereof and carry a pair of rubber coated rollers 16, 17. The axes of the rollers are spaced as to leave a gap between the rollers sufficient to enable gripping of the ticket to take place. The spacing between the rollers proper is preferably arranged to be 1.25 of the selected ticket thickness, the gap between the rubber coatings being 0.75 of the ticket thickness. The rollers are positioned so that the mouth formed by the rollers is at the level of the ticket at the bottom of the stack. The upper roller 16 is not driven but is free to idle and serves as a pressure roller. The lower roller 17 is driven by an electric motor 18, mounted on the underside of the plate 10, through meshing gear wheels 19, 20. The motor 18 is held on the plate by a bracket 21.

Figure 5:
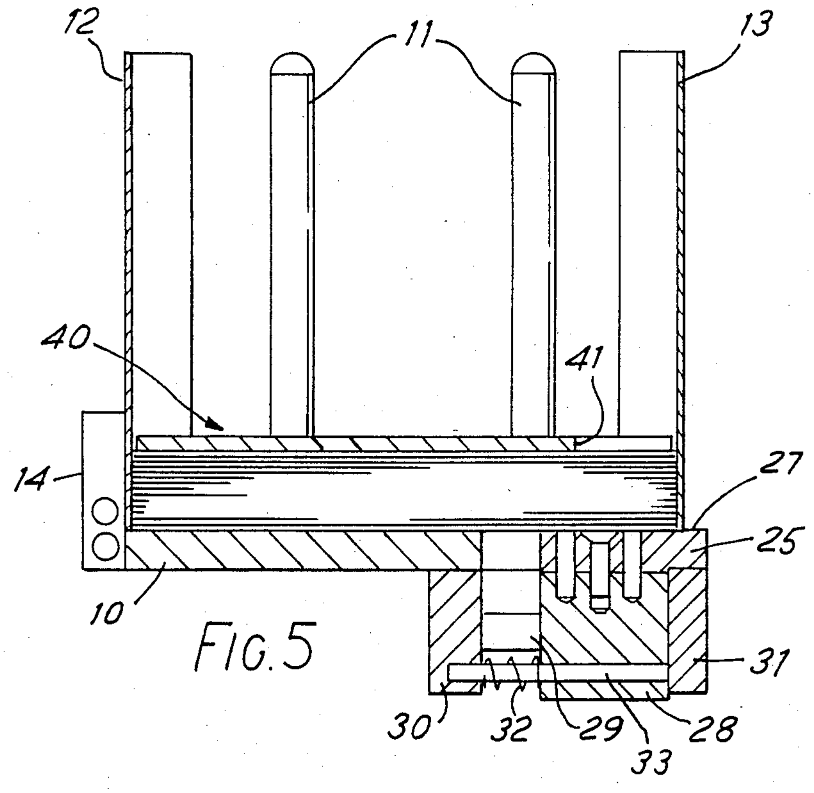
FIG. 5 is a section taken along the line D—D of FIG. 1.

A striker plate 25 is arranged to reciprocate within a slot 26 formed in the plate 10. As shown in FIG. 5 the striker plate is flush with the upper surface of the plate 10 except for a lip 27 provided at one end of the striker plate transverse to the direction of movement thereof.

The striker plate 25 is mounted on a block 28, preferably of plastics material, which is slidable on a pair of rods 29 carried by supports 30, 31 depending from the plate 10. A return spring 32 is provided between the support 30 and the block 28 and is retained by a guide rod 33 passing through the block 28 and carried by the supports 30, 31.

The block 28 carrying the striker plate 25 can be driven against the return spring pressure by means of a solenoid 35, the armature 36 of which is connected via a stud 37 to the block 28.

In order to ensure that the last few tickets in the stack, after dispensing the major portion thereof, are maintained in a flat state, a pressure plate 40 is provided which rests on the stack. A slot 41 is provided at one end of the plate 40 to permit free reciprocation of the lip 27 of the striker plate 25.

In operation, on receipt of a demand signal in the form of a single pulse (generated by means to be described) the solenoid 35 is actuated so that the striker plate 25 drives the bottom ticket T of the stack over a distance equal to the stroke S of the striker plate. By means of a suitable circuit the pulse also causes the motor 18 to be actuated so that the roller 17 is driven whereby as the ticket is delivered into the mouth of the rollers 16, 17 the latter grip the ticket and feed it to a delivery position e.g., through a slot in the housing (not shown) containing the dispensing machine. The motor 18 is actuated for a sufficient period to dispense the ticket clear of the rollers. Since actuation of the solenoid is subject to a short delay the motor will start up in time to receive the ticket driven towards the rollers by the striker plate.

Figure 7:
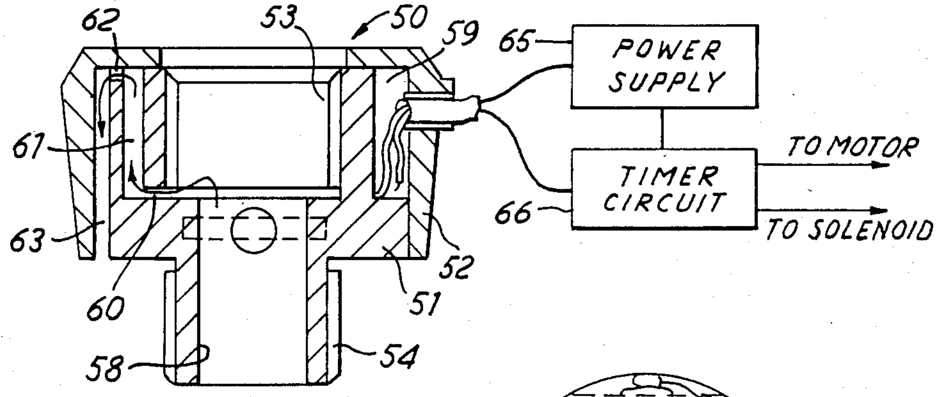
FIG. 7 is a section of a nozzle taken along the line F—F of FIG. 8.
Figure 8:
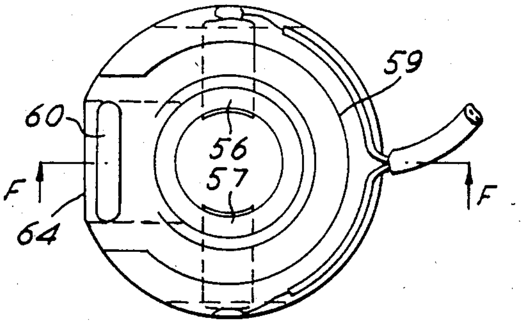
FIG. 8 is a plan view of the nozzle.
Figure 6C:
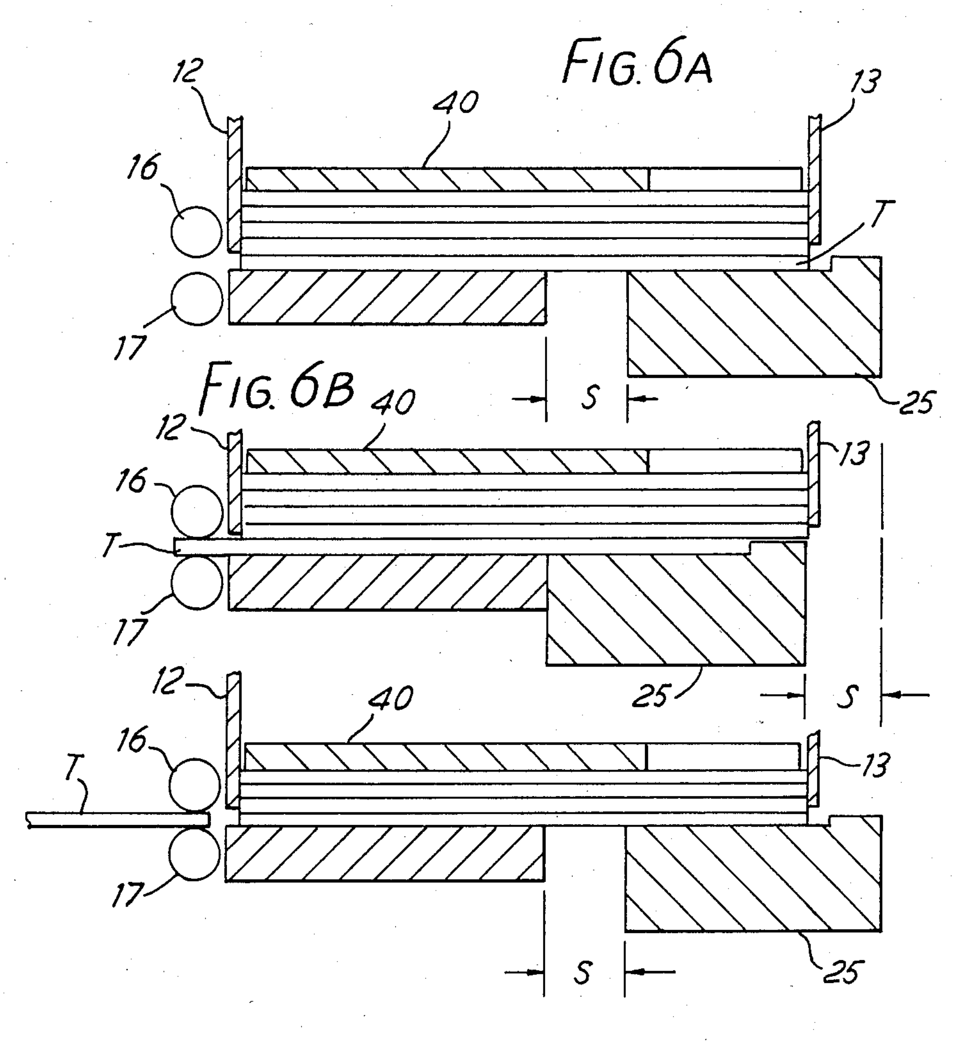

In order to generate a demand signal in the case of simultaneous dispensing of beer there is provided a sensor 50 (see FIGS. 7 and 8) which may be adapted to fit the nozzle of existing pump heads.

The sensor 50 comprises a body portion 51 and a cap 52 both made of a plastics material. The body portion 51 is provided with an internal thread 53 and an external thread 54. The two threads are preferably of the same thread pitch and size whereby the pump nozzle (not shown) may be removed, the sensor screwed by thread 53 to the threaded outlet of the pump head, and the nozzle screwed on to the external thread 54.

Electrodes 56, 57 (brass or stainless steel) are embedded in the body portion 51 and extend a small distance into the bore 58 of the portion 51 at right angles to the bore axis. The ends of the electrodes have part cylindrical surfaces conforming substantially to the surface of the bore 58. Leads attached to the outer ends of the electrodes pass through a recess 59 formed in the exterior of the body portion and through a sealed aperture in the wall of the cap 52.

To prevent liquid (such as beer) from being retained in the sensor which could give a false signal, a labrynth is provided in the form of a first channel 60 disposed radially in the body portion 51, approximately midway between the ends thereof, a second channel 61 extending from said first channel axially of the body portion to a third channel 62 which in turn communicates with a fourth channel 63 defines by a flat surface 64 on the body portion and the interior surface of the cap 52. The convoluted air path through these channels ensures that the liquid remaining in the pump head after delivery of a quantity of the liquid flows downwards and out of the nozzle.

The sensor detects the presence of liquid by the conductivity of the liquid between the electrodes, the electric circuit means emitting a pulse after the current passing between the electrodes falls below a threshold value. An alternating current is used in preference to a DC source in the liquid conductivity sensor to ensure that electrolysis is prevented between the electrodes.

The electric circuit may be arranged to provide an output pulse after a measured amount (½ pint or pint) of liquid has been dispensed. If desired the sensor may be an electro-optical device.

The purpose of the machine is to dispense one free pormotion ticket from a beer pump head, when a pint of beer has been served. This is achieved by timing the flow of beer through the sensing device attached to the beer outlet nozzle. The time period is adjustable from approximately 5 to 25 seconds, depending on the rate of flow from a particular pump.

A time delay of approximately 2 seconds may be incorporated into the reset circuit to override any short interruption of the beer flow, due say to a hand pump which delivers a pint in two separate pulls. If the interruption of flow is greater than two seconds the system will automatically reset. This will prevent a ticket being issued when two separate half pints are sold.

Should two or more pints be served without turning off the pump, the system has been designed to automatically reset after a ticket has been issued and will start the timing sequence for the next pint or pints.

The timing circuits 66 can be fabricated from standard timer integrated circuit chips although the use of microprocessor techniques will allow greater variation and flexibility to be available.

The whole system typically operates from either 12 volts AC or 24 volts AC external supply 65. The quiescent current is minimal except at the time of the ticket being issued. Approximately 1.5 amps for 1 second is required during ticket issue.

The ticket capacity in the style and size of head suitable for bar tops is approximately 200.

Although the embodiment has been described in relation to issuing tickets associated with beer sales, the arrangement may be used with other dispensers for example ticket dispensers operable in conjunction with a coin actuated device, or indeed other flowing liquids of petrol dispensing.

Alternatively, the sensor could detect the flow of liquid by some other parameter, such as by slight pressure differential using a pneumatic sensor (e.g., micro pneumatic Logic Inc. MPL 502).

I claim:

1. A ticket dispensing machine for application to a product dispensing apparatus, said machine comprising
(a) support means for a stack of tickets,
(b) a ticket drive roller,
(c) an electric motor drivably coupled to said roller,
(d) striker means adapted to engage an edge of the end ticket of the stack,
(e) means for driving said striker means in a direction to convey said ticket towards said roller,
(f) a sensor capable of initiating a signal on detecting the presence of a product being dispensed,
(g) electric circuit means connected to said sensor to activate said electric motor thereby to dispense said ticket from the machine on receipt by said circuit means of an input signal initiated by said sensor,
(h) timing means to actuate the motor and the striker drive means after a predetermined period from commencement of sensing of the presence of the product, said timing means being adapted to actuate the motor and the striker drive means only when the predetermined period exceeds a preselected value, and
(i) means for automatically repositioning said striker means to be available for dispensing the next ticket when required.

2. A machine according to claim 1, wherein said sensor includes an electrode for detecting a product in the form of an electrically conductive liquid product.

3. A machine according to claim 1, including a pressure roller adjacent the drive roller and arranged to assist the passage of the dispensed ticket between itself and the drive roller.

4. A machine according to claim 1, further comprising a nozzle through which an electrically conducting liquid product is dispensable, said sensor being provided within said nozzle.

5. A machine according to claim 4, wherein the nozzle includes a passage adapted to prevent retention of liquid after dispensing.

6. A machine according to claim 1, wherein said striker means includes a striker plate and said striker driving means includes a solenoid for actuating said striker plate, said machine further comprising electrical delay means whereby the solenoid is energized to effect movement of the ticket towards said drive roller after a period has elapsed from commencement of actuation on the electric motor.

7. A machine according to claim 6, wherein the motor and the solenoid are arranged to be actuated concurrently and the period elapsed is provided by the inherent operational delay of the solenoid.

* * * * *